United States Patent [19]

Stamnitz et al.

[11] Patent Number: 4,867,518

[45] Date of Patent: Sep. 19, 1989

[54] ALL-FIBER SFPM AMPLIFIER

[75] Inventors: Timothy C. Stamnitz, Encinitas; Stephen D. Russell, San Diego, both of Calif.

[73] Assignee: The United States of America as represented by the Secretary of the Navy, Washington, D.C.

[21] Appl. No.: 239,156

[22] Filed: Aug. 31, 1988

[51] Int. Cl.$^4$ .......................... G02B 6/26; G02B 6/42
[52] U.S. Cl. .................................................. 350/96.15
[58] Field of Search ............... 350/96.15, 96.10, 96.16; 307/425, 426

[56] References Cited

U.S. PATENT DOCUMENTS

| | | | |
|---|---|---|---|
| 4,342,499 | 9/1982 | Hicks, Jr. .......................... | 350/96.15 |
| 4,557,553 | 12/1985 | McLandrich .................... | 350/96.15 |
| 4,616,898 | 10/1986 | Hicks, Jr. .......................... | 350/96.15 |
| 4,699,452 | 10/1987 | Mollenauer et al. ............. | 350/96.15 |
| 4,723,824 | 2/1988 | Shaw et al. ....................... | 350/96.15 |
| 4,742,307 | 5/1988 | Thylen ................................ | 330/4.3 |

OTHER PUBLICATIONS

"Optical Fiber Modes Using Stimulated Four Photon Mixing"; Applied Optics; vol. 15, No. 1; Jan. 1976; pp. 239–243.
N. Anders Olsson et al, "Noise Properties of a Raman Amplifier", appearing in Journal of Lightwave Technology, vol. LT-4, No. 4, Apr. 1986, pp. 396–399.
Kennet Vilhelmsson, "Simultaneous Forward and Backward Raman Scattering in Low-Attenuation Single-Mode Fibers", appearing in Journal of Lightwave Technology, vol. LT-4, No. 4, Apr. 1986, pp. 400–404.
Dietrich Marcuse, "Mode Conversion in Optical Fibers with Monotonically Increasing Core Radius", appearing in Journal of Lightwave Technology, vol. LT-5, No. 1, Jan. 1987, pp. 125–133.
N. Amitay et al, "Optical Fiber Tapers-A Novel Approach to Self-Aligned Beam Expansion and Single-Mode Hardware", appearing in Journal of Lightwave Technology, vol. LT-5, No. 1, Jan. 1987, pp. 70–76.
K. P. Jedrezejewski et al, "Tapered-Beam Expander for Single-Mode Optical-Fibre Gap Devices", appearing in Electronics Letters, vol. 22, No. 2, Jan. 16, 1986, pp. 105–106.
Allen W. Snyder et al, Chapter 19 of publication entitled "Optical Waveguide Theory", published by Chapman and Hall, London and New York, 1983, pp. 407–419.

(List continued on next page.)

Primary Examiner—William L. Sikes
Assistant Examiner—Robert E. Wise
Attorney, Agent, or Firm—Harvey Fendelman; Thomas Glenn Keough

[57] ABSTRACT

An "integrated fiber" device provides optical signal amplification to: (1) provide for increased distances between undersea repeaters and/or optical regeneration nodes in fiber optic transmission systems, or (2) support an increased number of multiple users on an optical data bus network or multiple parallel signal processing channels in an optical processor/computer. In the latter case a greater number of divisions of the signal can occur before the divided signal amplitude falls below the threshold needed for processing or detection. A combination of fiber components is incorporated that include: two optically tapered portions for conditioning of two input laser beams to a wavelength selective single-mode coupler used to combine the concentrated information signal and concentrated pump wave, and one of whose output ports is then optically coupled to a predetermined length of single-mode fiber. The fibers optogeometric parameters are especially designed for intrinsic phase-matching to effect pump wave frequency conversion and signal amplification by the nonlinear optical process of stimulated four-photon mixing. The amplified signal light is coupled out of the especially designed SFPM fiber by a mode-field conditioning device enabling beam expansion, such that the output core diameter of the mode-field conditioner equals the core diameter of the single-mode fiber used in the transmission link. An important aspect of this invention is that it can be configured for field and/or undersea installation.

7 Claims, 1 Drawing Sheet

OTHER PUBLICATIONS

A. R. Nelson, "Coupling Optical Waveguides by Tapers", appearing in Applied Optics, vol. 14, No. 12, Dec. 1975, pp. 3012–3015.

M. M. Fejer et al, "Laser Assisted Growth of Optical Quality Single Crystal Fibers", appearing in SPIE, vol. 460, Processing of Guided Wave Optoelectronic Materials (1984), pp. 26–32.

M. J. F. Digonnet et al, "1.064– and 1.32-$\mu$m ND:YAG Single Crystal Fiber Lasers", appearing in Journal of Lightwave Technology, vol. LT-4, No. 4, Apr. 1986, pp. 454–460.

Chinlog Lin, "Nonlinear Optics in Fibers for Fiber Measurements and Special Device Functions", appearing in Journal of Lightwave Technology, vol. LT-4, No. 8, Aug. 1986, pp. 1103–1115.

Y. R. Shen, "Stimulated Raman Scattering", appearing in Light Scattering in Solids, Cardona M., (Springer-Verlag, Berlin, Heidleburg, NY 1983), Chap. 7, pp. 283–290.

N. K. Dutta et al, "High-power Gain-Guided InGaAsP Laser Array", appearing in Applied Physics Letters, vol. 45, No. 9, 1 Nov. 1984, pp. 940–943.

M. Fazeghi et al, "CW Phase-Locked Array $Ga_{0.25}In_{0.75}As_{0.5}P_{0.5}$-InP High Power Semiconductor Laser Grown by Low-Pressure Metalorganic Chemical Vapor Deposition", appearing in Applied Physics Letter, vol. 50, No. 5, 2 Feb. 1987, pp. 230–232.

Rogers H. Stolen, "Nonlinear Properties of Optical Fibers", appearing in Optical Fiber Telecommunications, S. E. Miller and A. C. Chynoweth, Editors, Academic Press, 1979, pp. 125–150.

Rogers H. Stolen, "Nonlinearity in Fiber Transmission", appearing in Proceedings of the IEEE, vol. 68, No. 10, Oct. 1980, pp. 1232–1236.

R. G. Smith, "Optical Power Handling Capacity of Low Loss Optical Fibers as Determined by Stimulated Raman and Brillouin Scattering", appearing in Applied Optics, vol. 11, No. 11, Nov. 1972, pp. 2489–2494.

R. L. Herbst et al, "A 1.4–4 m High-Energy Angle-Tuned $LiNbO_3$ Parametric Oscillator", appearing in Applied Physics Letters, vol. 25, No. 9, 1 Nov. 1974, pp. 520–522.

A. Yariv, "The Modulation of Optical Radiation", appearing in Introduction to Optical Electronics, (Holt, Rinehart & Winston), 2nd Edition, 1976, pp. 222–239.

R. H. Stolen et al, "Phase-Matched Three-Wave Mixing in Silica Fiber Optical Waveguides", appearing in Applied Physics Letters, vol. 24, No. 7, 1 Apr. 1974, pp. 308–310.

R. H. Stolen et al, "Optical Fiber Modes Using Stimulated Four Photon Mixing", appearing in Applied Optics, vol. 15, No. 1, Jul. 1975, pp. 239–243.

K. Washio et al, "Efficient Large-Frequency-Shifted Three-Wave Mixing in low Dispersion Wavelength Region in Single-Mode Optical Fibre", appearing in Electronics Letters, vol. 16, No. 17, 14 Aug. 1980, pp. 658–660.

Chinlon Lin et al, "Phase Matching in the Minimum-Chromatic-Dispersion Region of Single-Mode Fibers for Stimulated Four-Photon Mixing", appearing in Optics Letters, Oct. 1981, vol. 6, No. 10, pp. 493–495.

Chinlon Lin, "Designing Optical Fibers for Frequency Conversion and Optical Amplification by Stimulated Raman Scattering and Phase-Matched Four-Photon Mixing", appearing in Journal of Optical Communications, 4 (1) 1983, pp. 2–9.

J. P. Pocholle et al, "Raman and Four Photon Mixing Amplification in Single Mode Fibers", appearing in Optical Engineering, Jul./Aug. 1985, vol. 24, No. 4, pp. 600–608.

John Auyeung et al, "Spontaneous and Stimulated Raman Scattering in Long Low Loss Fibers", appearing in IEEE Journal of Quantum Electronics, vol. QE-14, No. 5, May 1978, pp. 347–352.

John Auyeung et al, "Theory of CW Raman Oscillation in Optical Fibers", appearing in Journal, Opt. Soc. Am., vol. 69, No. 6, Jun. 1979, pp. 803–807.

ALL-FIBER SFPM AMPLIFIER

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This application is related to co-pending U.S. Pat. applications Ser. No. 239,158 (NC 70839) and Ser. No. 242,466 (NC 70921) for a Tapered Fiber Amplifier and a Mode Field Conditioner, respectively.

BACKGROUND OF THE INVENTION

Long-haul optical data links are being more extensively used for the reliable transmission of data. The high data rates and low optical attenuation associated with fiber optic links are well-established and are becoming more appreciated as the links have become more economical than alternatives based upon electrical coaxial cables. In spite of the relatively low magnitude of optical signal loss during transmission, the intrinsic linear attenuation law of lightwave energy in optical fibers, has resulted in the necessity of optical repeater nodes to amplify and/or to regenerate the digital optical bit streams in long-haul terrestrial and undersea communication systems. Typically, unrepeatered distances extend from 30 to 70 kilometers in length, depending upon the fiber loss at the selected transmission wavelength which is ordinarily 1.3 or 1.55 microns, respectively.

Repeaterless links or longer unrepeatered distances reaching from 200 to 400 kilometers, for example, would represent a less expensive and more reliable system. This feature is particularly attractive in the realm of undersea communications, since it would relieve the initial material, equipment and installation expense of undersea repeaters, and provide a reduction in the recovery and servicing expenses associated with repair of undersea optical nodes.

An innovative approach for improving an optical long-haul communications link capability might be the use of nonlinear optical effects for enhanced fiber signal transmission. This approach to date has not been obvious to those associated with this art, since fibers are usually considered as being completely passive; i.e., a more or less linear media for the transmission of optical data. Ironically, some influential papers written in the 1970's to introduce and promote nonlinear "active" properties of optical fibers, simultaneously argued that these nonlinear effects (stimulated Raman scattering, stimulated Brillouin scattering, self-phase modulation, and stimulated four-photon mixing) constituted "processes imposing limits on the peak power of fiber transmission systems", see "Nonlinear Properties of Optical Fibers", by R.H. Stolen, appearing in *Optical Fiber Telecommunications*, S.E. Miller and A.G. Chynoweth, Editors, Academic Press, 1979, and "Nonlinearity in Fiber Transmission", by R.H. Stolen, *Proceedings IEEE*, Vol. 68, No. 10, October 1980.

The misconception, or rather, misdirection of insight, that fiber nonlinearities impose limits on peak power transmission in fiber optic systems, apparently arose from an unconscious, arbitrary restriction to linear systems. In these systems and in this context, frequency conversion was misconstrued as a "power-dependent loss mechanism....producing amplitude distortion at the receiver if the detector is intrinsically frequency sensitive or narrow band filters are used"; see "Optical Power Handling Capacity of Low Loss Optical Fibers as Determined by SRS and SBS", by R.G. Smith, *Journal of Applied Optics*, Vol. 11, No. 11, November 1972. In view of the dominant influence of linear fiber optic systems which heretofore represent nearly the entire scope and content of the prior art in fiber communications, the above misleading notions can be excused. Embracing the much broader perspective of nonlinear light wave communications, however, provides the basis for properly introducing especially designed segments of active fiber-optic lines, and for resolution of all the difficulties associated with light transmission systems utilizing energy densities sufficiently high to induce nonlinear effects.

In spite of the initially discouraging view with respect to utilizing high power densities accompanied by nonlinear optical effects in fiber optic communication systems, laboratory workers in the late 70's, and early 80's recognized several important features of the indirect methods needed to take advantage of nonlinear optical techniques for the purpose of signal amplification. To appreciate the enhancement potential of nonlinear optical effects in fiber optic communications, certain innovative points have to be understood. The first point is that the interaction of light from a pump and signal laser, respectively, within a single fiber constitutes an essential feature of nonlinear signal amplification. The second point is that the frequency conversion of the high energy pump laser will transfer energy into the signal band which is at a lower frequency, and that the nature of this transformation can be qualitatively and quantitatively predicted. The last point is that the predicted frequency conversion must be taken into account in the design of a proper receiver/detector configuration.

Most of the early experiments utilized the nonlinear effect known as stimulated Raman scattering (SRS), in order to obtain, during propagation through an optical fiber, the frequency conversion and the transfer of energy from the pump wave into the signal wave. The development of signal amplification via SRS is summarized in the co-pending patent application for a "Tapered Fiber Amplifier" (NC 70839).

In addition, many laboratory experiments were conducted from 1974-1980 to show the feasibility of signal amplification by the nonlinear optical process of stimulated four photon mixing (SFPM). The experimentation revealed certain difficulties in obtaining a tunable pump laser configuration for amplifying signal wavelengths in the 1.1 to 1.6 micron range. For example, when a Nd:YAG laser is used as a relatively high-energy pump, the stimulated four-photon mixing (SFPM) process produces frequency conversion and amplification of a signal at approximately 1.5 microns, but appears possible only by two successive stages of parametric generation using bulk optical components. These stages included: first, light from the Nd:YAG would have to pass through a bulk crystal for second harmonic generation; and secondly, through an angle tuned crystal for further parametric generation. The complicated nature of this setup, and the intrinsic inefficiencies were considered prohibitive for practical situations [further insight is provided by "A 1.4-4.0 micron high-energy angle-tuned LiNbO₃ parametric oscillator", R.L. Herbst et al, *Applied Physics Letters*, Vol.25, No.9, Nov. 1974, p. 520–22; also, *Introduction to Optical Electronics*, by A. Yariv (Holt, Rinehart & Winston, 2nd Ed., 1976, p. 222–239 )].

Stimulated four photon mixing or parametric generation can occur only by phase-matching of the pump waves to the signal and idler waves in the propagation medium. During the period from 1974 to 1980, it was determined and verified experimentally that the phase-match condition could be satisfied in certain optical fibers by tailoring their opto-geometrical parameters; see "Phase-matched three-wave mixing in silica fiber optical waveguides," R.H. Stolen, J.E. Bjorkholm, and A. Ashkin, *Applied Physics Letters*, Vol.24, No.7, Apr. 1974, p. 308– 10; "Optical fiber modes using stimulated four photon mixing,"R.H. Stolen and W.N. Leibolt, *Applied Optics*, Vol.15, No.1, Jul. 1975, pg. 239–43; and "Efficient Large-Frequency-Shifted Three-Wave Mixing in Low Dispersion Wavelength Region in Single-Mode Optical Fibre," K. Washio et al, *Electronics Letters*, Vol.16, No. 17, Aug. 1980, p. 658–660.

Finally, in 1981, Chinlon Lin et al. established a clear criteria for "Phase matching in the minimum-chromatic-dispersion region of single-mode fibers for stimulated four-photon mixing," *Optics Letters*, Vol. 6, No. 10, Oct. 1981, p. 493–495. However, signal amplification by SFPM in optical fibers has been demonstrated heretofore on precision optical benches in the laboratory only.

Thus, a continuing need exists in the state-of-the-art for a practical, field installed device for amplification of 1.3 and 1.55 micron laser diode signals by frequency conversion of a pump wave via the phenomena known as stimulated four-photon mixing, so as to increase the distance between optical repeaters and/or regenerator nodes in undersea long-haul fiber optic transmission links.

SUMMARY OF THE INVENTION

The present invention is directed to providing a practical (field-installed) method for optical signal amplification via frequency conversion of a pump laser beam by stimulated four-photon mixing (SFPM) in a single-mode fiber. Tapered fiber portions are used to couple and concentrate the single-mode electromagnetic beams (mode-fields) generated by pump and signal lasers, respectively, for transmission through single-mode fiber portions attached to the input channels of a wavelength-selective fiber-optic coupler. Through this "conditioning" the pump and signal light are simultaneously coupled and combined for stimulated four-photon mixing in an especially designed, optimum length of single-mode fiber. By proper choice of the fiber's dopant material and density, and other opto-geometric parameters of the dielectric waveguide configuration, signal amplification of the selected wavelength, for example, 1.55 microns, is effected by the SFPM Stokes wave, which offers the possibility of greater overall efficiency than in the case of alternative nonlinear amplifiers. The gain coefficient for the mixing process is about a factor of five larger than for the SRS process. The amplified signal from the output end of the special SFPM fiber is extracted via a tapered fiber portion, wherein, the input end of the taper is typically at a smaller diameter (equal to the special SFPM fiber core— about 2–7 microns) than the output end of the taper, which equals the core diameter of the transmission fiber; i.e., about 8–10 microns.

An object of the invention is to provide for an "integrated fiber" construction of an optical amplifier which allows for application to a long-haul communication link or to a transmission line network (data bus) over which a number of physically seperated terminals can communicate with one another, and which allows for installation in situ.

Another object is to provide for optical amplification in a nonlinear optical device having increased coupling efficiency between the pump and signal sources; due both to the mode-field intensification resulting from the tapered dielectric waveguide portions joined to the wavelength selective coupler and to the wavelength selective couplers efficient combining of pump and signal.

Still another object is to provide for amplification of the relatively long (second-window) ∼1.55 micron wavelength light from a laser diode via a stimulated four-photon mixing process in an intrinsically phase-matched single-mode fiber segment of optimum length (typically, tens of meters), which is optically connected within a point-to-point transmission link or an optical fiber data bus (star configuration or in-line/T-coupler) network architecture.

Still another object is to provide a method for signal amplification by the nonlinear process of stimulated four photon mixing, wherein, the pump wavelength and the signal wavelength may be changed independently or together, and phase-matching can still be obtained via changing the opto-geometric parameters and/or the dopant parameters of the predetermined length of single-mode fiber (or in general, the single-mode dielectric waveguide) being used for SFPM amplification.

These and other objects of the invention will become more readily apparent from the ensuing specification when taken in conjunction with the appended claims and drawings.

DESCRIPTION OF THE PREFERRED EMBODIMENTS

Figure 1:
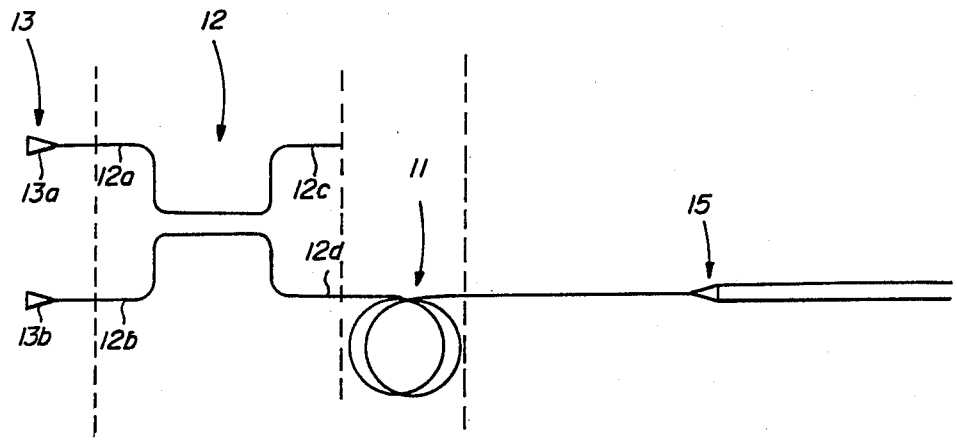
FIG. 1 shows a minimum SFPM amplifier configuration having the capability of increasing the distance between optical regenerator nodes/repeaters and improving the reliability of the associated fiber-optic transmission link. Similarly, the minimum all-fiber SFPM amplifier has the capability of increasing the number of optical nodes (or subscribers) on an optical data bus transmission network.

Referring to FIG. 1, a stimulated four-photon mixing (SFPM) amplifier 10 is fabricated as a single, integrated, compact device for practical field applications. The SFPM amplifier is made up of four component stages, which synergistically cooperate to provide optical designers a heretofore unrealized data transmission capability. Component stages include a four-photon mixing (FPM) fiber 11, a pump and signal laser coupler 12, an optical mode field conditioner stage 13, and an output coupler mode field conditioner 15. The component stages function in an optically interdependent manner in order to amplify a relatively long wavelength optical information signal for transmission on a long-haul communications link or an optical fiber data bus network. The combination of stages is such as to assure improved communications capabilities (longer point-to-point distances and/or an increased number of terminals on an in-line data bus) by selective amplification of the wavelength of interest.

The FPM fiber 11 is selected to have opto-geometrical parameters that are specifically designed to induce phase-matching of pump and data signal lights during their nearly simultaneous transit therethrough. Fiber 11 is a single-mode fiber and usually 30-50 meters in length; but the precise length, less than or greater than the nominal value, is calculated for optimum amplification depending upon other fiber-optic system parameters (i.e., pump wavelength, signal wavelength, peak and average pump powers, material and waveguide dispersion, etc.).

Suitable design of the FPM fiber 11 has been explained in the open literature; for example, see "Designing Optical Fibers for Frequency Conversion and Optical Amplification by Stimulated Raman Scattering and Phase-Matched Four-Photon Mixing", by Chinlon Lin, *Journal of Optical Communications*, 4 (1), pp. 2-9, 1983 (also, the previously referenced Chinlon Lin et al, "Phase matching in the minimum-chromatic-dispersion region of single-mode fibers for stimulated four-photon mixing," *Optics Letters*, Vol.6, No.10, Oct. 81, p. 493-95).

Another article which deals with signal amplification by SFPM in a suitably designed single-mode fiber, utilizing an experimental configuration which is only remotely similar to that visualized in the present invention, is entitled "Raman and Four-Photon Mixing Amplification in Single-Mode Fibers," by J.P. Pochelle et al, *Optical Engineering*, Vol. 24, No. 4, Jul.-Aug. 1985, p. 600-608. The experimental set up described therein for SFPM amplification of a 1.57 micron laser-diode signal requires bulk-optical components (i.e., beamsplitter, lens, etc.) precisely positioned on a precision optical bench for collinear alignment and coupling of the pump and signal lasers into the FPM fiber.

The all-fiber SFPM amplifier described in the present invention can be installed in an undersea optical node; and can conveniently or economically be installed in a land-based field situation. Tapered fiber portions (or tapered dielectric waveguides in general) are used to achieve power intensification and an efficient launch of energy from the pump laser beam.

Referring to the all-fiber SFPM amplifier 10 in FIG. 1, for a given selected pump wavelength, typically 1.32 microns, the core diameter and index of refraction profile ($\Delta n$) of fiber 11 are custom-designed to produce phase-matching, engendering a desired frequency shift for amplification of the signal wavelenght depending upon the specigic fiber dopant parameters and core diameter. Shifts of about 1000 cm$^{-1}$ are typically required to amplify 1.54-1.57 micron lasor diodes. A nominal 40-45 dB optical gain is expected for a 1.32 micron peak pump power of about 75 watts, when a 1.57 micron input signal of approximately 30 microwatts is used. In this case, for example, it would be necessary to operate the Nd:YAG pump laser at 1.32 microns, which is within the capabilities of current off-the-shelf components.

A pump and signal laser coupler 12 provides a capability for field installation and ruggedness through simplicity of design. Typically, the coupler could be substantially identical to that disclosed by Matthew McLandrich in his U.S. Pat. No. 4,557,553. The wavelength selective, fused, tapered single-mode coupler of the patent fulfills the object of combining the pump and signal lights and simultaneously launching them into the length of FPM fiber 11 to obtain phase-matched stimulated four photon mixing with the production of a Stokes wave at the signal wavelength which then amplifies the signal light. The pump and signal laser coupler 12 is custom-designed in accordance with criteria identified in the McLandrich patent, for the particular pump and signal wavelenghts selected for the stimulated four-photon mixing application.

In order to asure efficient amplification in the fiber 11, the coupled pump and signal wavelengths are appropriately combined in the coupler 12 after they have been introduced to the coupler via optical mode field conditioner stage 13. The mode field conditioners 13a and 13b are included to assure efficient mode field coupling and to assure optimum stimulated four-photon mixing amplification via mode-field intensification of the signal and pump laser beams, respectively. The conditioners perform in accordance with the disclosure of the mode field conditioner patent application cited above, in order to obtain relatively high-power densities in the input end of the coupler 12, which enhances signal amplification by SFPM in the FPM fiber 11, which is custom-designed for that purpose. In this regard, output coupling at 15 from amplifier 10 is achieved via a similarly designed mode field conditioner 15 to allow the SFPM amplified signals to be coupled into a larger-diametered single-mode fiber serving as the transmision fiber in the communications or data bus link. All components in this invention are typically coupled via fusion splicing.

The configuration of couplers 13a, 13b, as well as 15 is in accordance with the "slowness criteria" as establishid by Alan W. Snyder and John D. Love in Chapter 19 of *Optical Waveguide Theory*, London, New York, Chapman and Hall, 1983. According to the slowness criterion, the degree of the optical taper (the rate of change of the decreasing core radius) is such that light may transition the tapered region "adiabatically"; that is, without disturbing the single-moded nature of the propagation, and without inducing excessive loss of optical energy. The mode field conditioners 13a and 13b are fabricated so that the intensities at the smaller output end are roughly at least an order of magnitude greater than the intensity coming into the larger diametered input end. Input ends typically have diameters of 8-10 microns to accommodate single-mode long-haul communication links and the smaller ends of both of these conditioners have 2 to 7 micron core diameters to match the fibers of the coupler 12. In this regard, however, coupler 12 could be made of larger diametered single-mode fiber, for example, the 8-10 micron size and mode field conditioners 13a and 13b could be such as to gather and intensify light from even larger single-mode optical wave guides and/or laser beams. When this is the case, however, it is advisable to interpose an additional mode field conditioner at the output of 12d in coupler 12 to achieve a further concentration of the pump and signal light intensities for input into the FPM fiber 11. The mode-field conditioneer at 13b will have an order of magnitude larger core diameter (than the core diameter of 13a) when a solid-state pump laser having a relatively large spot size is used. In any application herein, the mode field conditioners serve to prevent damage to the fiber ends; otherwise attributable to intense energy concentration.

The core composition of the FPM fiber 11 may be varied by adding suitable dopant atoms during the fabrication process or by utilizing a substantially different composition, for example, non-silica, for the core. Such modifications would create different electronic states and thereby allow amplification of wavelengths excluded in standard silica fibers. The methods for achieving phase-matching by compensation of the fibers material dispersion by waveguide dispersion (near the zero-dispersion wavelength) are set out in the aforementioned articles by Chinlon Lin et al.

The use of mode field conditioning to launch and extract the optical signals via mode field conditioners 13a, 13b and 15 in such cases would also result in increased amplifier gain. Alternative pump sources (i.e., phase-locked laser diode arrays) would allow amplification of different signal wavelengths, however, the design of the fiber opto-geometrical parameters must always be done specifically for the pump source and laser diode signal conbination selected. The problems associated with laser beam alignment and light energy concentration required for significant signal gain are substantially relieved with the conditioners.

The use of a phase-locked laser-diode array as the pump laser source in combination with the all-fiber SFPM amplifier permits an efficient and economical packaging for incorporation, for example, into optical regenerators and/or undersea optical nodes.

Figure 2:
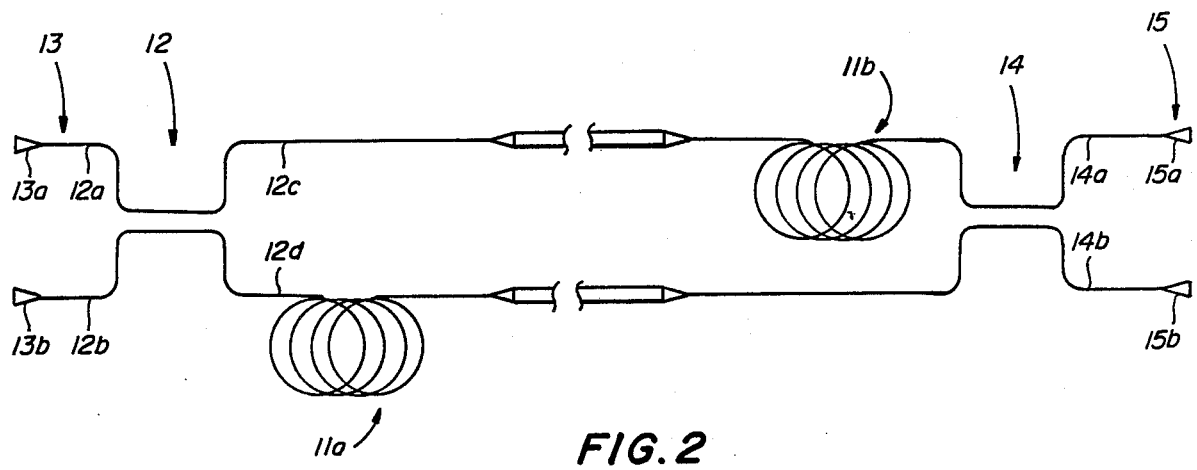
FIG. 2 depicts a symmetrical (two-directional) SFPM amplifier in which the use of an additional all-fiber SFPM configuration is attached at the far terminal of the fiber-optic transmission link (or at the opposite end of a particular data bus link that joins two users), such that signal transmission and amplification may be effected in both directions (full-duplex).

An alternative embodiment of the SFPM amplifier configuration is shown in FIG. 2. This is characterized as an alternative "symmetrical" configuration wherein a fused tapered single-mode fiber coupler 14 similar to 12 is disposed and appropriately coupled, e.g. by fusion splicing, to two FPM fibers 11a and 11b. In this configuration, the detailed design of the couplers 12 and 14 and the corresponding SFPM fiber coils 11a and 11b, respectively, need not be the same. In other words, whenever two mode field conditioners 15a and 15b are likely to be employed at conditioner stage 15 bidirectional transmissions are assured (and the two respective signal wavelengths being amplified may be different from each other). Here again, however, the constituency, dimensions and length of the two FPM fibers 11a and 11b must be taken into account to assure phase-matching which is required for SFPM amplification.

Obviously, many modifications and variations of the present invention are possible in light of the above teachings. It is therefore to be understood that within the scope of the appended claims, the invention may be practiced otherwise then as specifically described.

What is claimed is:

1. An apparatus for amplifying data signals by stimulated four-photon mixing comprising:
   a first tapered optical portion optically coupled to receive the data signals at an input end and having a light transmission portion interposed between the input end and an output end, the first tapered optical portion being fabricated so as not to disturb single-mode, the input end has a greater area than the output end, thereby concentrating the data signal intensity therethrough;
   a source of optical pump signals;
   a second tapered optical portion optically coupled to receive the optical pump signals at an input end and having a light transmissive portion interposed between the input end and an output end, the second tapered optical portion being fabricated so as to not disturb single-mode, the input end has a greater area than the output end thereby concentrating the pump signal intensity therethrough;
   a coupler section optically coupled to receive the concentrated data signal intensity from the first tapered optical section and the concentrated pump signal intensity from the second tapered optical section; and
   means optically coupled to the coupler section having a sufficient length of optical transmissive material for optically amplifying data signals by energy transfer from the Stokes and/or anti-Stokes wave induced by phase-matched stimulated four-photon mixing.

2. An apparatus according to claim 1 further including:
   a third tapered optical portion optically coupled to the optically amplifying means at an input end and having a light transmissive portion interposed between the input end and an output end, the third tapered optical portion being fabricated so as not to disturb single-mode and the input end has a smaller area sized to correspond to the optically amplifying means and the output end which corresponds to the long-haul transmission link.

3. An apparatus according to claim 1 in which the optically amplifying means is a length of single-mode fiber fabricated from an optically transmissive material appropriately dimensioned and whose other opto-geometric parameters are optimized so that phase matching is achieved to assure stimulated four-photon mixing and amplification of the data signals by the Stokes wave.

4. An apparatus according to claim 1,2 or 3 in which the first and second tapered optical portions have input ends of about 8-10 microns and output ends of about 2 to 7 microns and the third tapered optical portion has an input end of about 2 to 7 microns and an output end of about 8-10 microns.

5. An apparatus according to claim 4 in which the first second and third tapered optical portions are single-mode tapers.

6. A method for amplifying optical data signals comprising:
   concentrating the intensity of the data signals through a first tapered optical portion fabricated so as not to disturb single-mode;
   providing pump signals;
   concentrating the intensity of the pump signals through a second tapered optical portion fabricated so as not to disturb single-mode;
   combining the concentrated data signal intensity and the concentrated pump signal intensity in a wavelength selective single-mode coupler;
   confining the concentrated data signals and the concentrate pump signals within a single-mode fiber having a lesser core diameter than a conventional 8-10 micron long-haul communication link;
   amplifying the data signals in this lesser core diametered single-mode fiber by phase-matched stimulated four-photon mixing.

7. A method according to claim 6 further including:
   adding an appropriately connected symmetrical amplifier portion so that amplification is bidirectional phase-matched stimulated four-photon mixing allowing full-duplex transmission.

* * * * *